(12) United States Patent
Johnson

(10) Patent No.: US 7,376,648 B2
(45) Date of Patent: May 20, 2008

(54) COMPUTER-IMPLEMENTED METHODS AND SYSTEMS FOR ENTERING AND SEARCHING FOR NON-ROMAN-ALPHABET CHARACTERS AND RELATED SEARCH SYSTEMS

(75) Inventor: Richard C. Johnson, East Setauket, NY (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 10/969,488

(22) Filed: Oct. 20, 2004

(65) Prior Publication Data

US 2006/0089928 A1   Apr. 27, 2006

(51) Int. Cl.
G06F 17/30 (2006.01)
G06F 7/00 (2006.01)
G06F 3/048 (2006.01)
G06F 17/28 (2006.01)

(52) U.S. Cl. .............................. 707/4; 715/780; 704/2; 704/9; 704/254

(58) Field of Classification Search .................... 707/4; 715/780; 704/2, 9, 254
See application file for complete search history.

(56) References Cited

U.S. PATENT DOCUMENTS 4,498,143 A * 2/1985 Strzelecki ................... 715/535

(Continued)

FOREIGN PATENT DOCUMENTS

| WO | WO 82/00442 | 2/1982 |
| WO | WO 98/25252 | 6/1998 |
| WO | WO 00/79436 A | 12/2000 |

OTHER PUBLICATIONS

Karakos, Alexandros, "Greeklish: An Experimental Interface for Automatic Transliteration", Journal of American Society for Information Science and Technology, vol. 54 Issue 11, Jun. 12, 2003, pp. 1069-1074.*

(Continued)

Primary Examiner—John E. Breene
Assistant Examiner—Robert Stevens
(74) Attorney, Agent, or Firm—Young Law Firm, P.C.

(57) ABSTRACT

A computer-implemented method for selecting a desired Roman or non-Roman-alphabet character or objects from a set of non-Roman characters or objects may include steps of providing an association database that includes, for each non-Roman-alphabet character of the set, a Roman alphabet or other phonetic transliteration associated with each said non-Roman-alphabet character and a plurality of entries that are associated with each said non-Roman-alphabet character; receiving a phonetic transliteration of the desired non-Roman-alphabet character or data object and at least one associated entry that is associated with the desired non-Roman-alphabet character or other similar symbolic input; accessing the association database and identifying as candidate characters those characters of the set that are associated with the received phonetic transliteration and with the at least one received associated entry; if a number of candidate characters is greater than one, receiving additional associated entries and repeating the accessing and identifying step until a number of candidate characters is narrowed down to a single candidate character, and providing the single candidate character as the desired non-Roman-alphabet character. Also, derived from the principles described above, this invention includes a variety of methods for improving the efficiency of search engines through use of associations and other means of providing context for the item(s) being searched.

71 Claims, 10 Drawing Sheets

| SYMBOL | ROMAJI | ASSOC. 1 | ASSOC. 2 | ASSOC. 3 | ASSOC. 4 | ASSOC. 5 | ASSOC. 6 | ASSOC. 7 | • • • | ASSOC. n |
|---|---|---|---|---|---|---|---|---|---|---|
| 望 | kitai | Hope | Anticipation | Expectation | Wish | Spring | Dream | Cancer | | |
| 危 | kitai | Danger | Jeopardy | Distress | Fear | Keep Out | Godzilla | | | |
| 体 | kitai | Fuselage | Body | Airplane | Airplane | Wreck | Airframe | | | |
| 気 | kitai | Gas | Vapor | Air | Car | Explode | CO2 | | | |
| 刀 | ken | Sword | Sabre | Blade | Bayonet | Sting | Clock Hand | Kill Bill | Jet Li | |
| 件 | ken | Matter | Case | Item | Form | Fact | Application | | | |
| 券 | ken | Ticket | Coupon | Bond | Certificate | Speeding | Form | Concert | Traffic | |
| 県 | ken | Prefecture | Official | Gov't | Region | Admin | Kyoto | Department | | |
| 権 | ken | Right | Power | Authority | Influence | Wrong | Privilege | | | |
| 験 | ken | Test | Exam | School | Anxiety | Case | Grade | | | |

JAPANESE 502
MANDARIN CHINESE 504
CANTONESE CHINESE 506
SHANGHAINESE CHINESE 508

U.S. PATENT DOCUMENTS

| | | | |
|---|---|---|---|
| 4,565,459 A * | 1/1986 | DiLucia | 400/110 |
| 5,410,306 A * | 4/1995 | Ye | 341/28 |
| 5,432,948 A | 7/1995 | Davis et al. | |
| 5,535,120 A * | 7/1996 | Chong et al. | 704/3 |
| 5,659,769 A * | 8/1997 | Kida et al. | 715/530 |
| 5,835,924 A * | 11/1998 | Maruyama et al. | 715/535 |
| 5,918,206 A * | 6/1999 | Wong et al. | 704/271 |
| 5,966,637 A * | 10/1999 | Kanungo et al. | 725/132 |
| 5,978,798 A * | 11/1999 | Poznanski et al. | 707/4 |
| 5,978,799 A | 11/1999 | Hirsch et al. | |
| 6,170,000 B1 * | 1/2001 | Bories et al. | 715/535 |
| 6,377,966 B1 * | 4/2002 | Cooper et al. | 715/542 |
| 6,421,680 B1 * | 7/2002 | Kumhyr et al. | 707/6 |
| 6,460,034 B1 | 10/2002 | Wical | |
| 6,562,078 B1 * | 5/2003 | Yang et al. | 715/535 |
| 6,636,238 B1 * | 10/2003 | Amir et al. | 715/730 |
| 6,890,180 B2 * | 5/2005 | Sterns et al. | 434/157 |
| 7,107,218 B1 * | 9/2006 | Preston | 704/270 |
| 2001/0029455 A1 * | 10/2001 | Chin et al. | 704/277 |
| 2002/0083029 A1 * | 6/2002 | Chun et al. | 706/45 |
| 2002/0184003 A1 * | 12/2002 | Hakkinen et al. | 704/8 |
| 2003/0061025 A1 * | 3/2003 | Abir | 704/7 |
| 2003/0171910 A1 * | 9/2003 | Abir | 704/1 |
| 2003/0200079 A1 * | 10/2003 | Sakai | 704/8 |
| 2004/0044791 A1 * | 3/2004 | Pouzzner | 709/245 |
| 2004/0098248 A1 * | 5/2004 | Otani | 704/8 |
| 2004/0103075 A1 * | 5/2004 | Kim et al. | 707/1 |
| 2004/0117192 A1 * | 6/2004 | Miletzki | 704/277 |
| 2005/0195171 A1 * | 9/2005 | Aoki et al. | 345/172 |
| 2005/0197835 A1 * | 9/2005 | Reinhard et al. | 704/249 |

OTHER PUBLICATIONS

Kumaran, A., et al., "On Database Support for Multilingual Environments", RIDE-MILM 2003, Mar. 10-11, 2003, pp. 23-30.*

Wan, Stephen, et al., "Automatic English-Chinese Name Transliteration for Development of Multingual Resources", Proceedings of the 36th Annual Meeting of the Association for Computation Lingusitics, Montreal Canada, © 1998, pp. 1352-1356.*

"Machine Vision", Wikipedia, downloaded from: en.wikipedia.org/wiki/Machine_vision, pp. 1-5, Aug. 10, 2007.*

Haizhou, Li, et al., "A Joint Source-Channel Model for Machine Transliteration", Proceedings of the 42nd Annual Meeting on Association for Computatiional Lingustics, Barcelona, Spain, Jul. 21-26, 2004, Article #159, pp. 1-8.*

International Search Report mailed Nov. 18, 2005, in related International Application No. PCT/US2005/017492, filed May 10, 2005 (6pgs).

Written Opinion mailed Nov. 18, 2005, in related International Application No. PCT/US2005/017492, filed May 10, 2005 (10pgs).

Communication relating to the results of the partial international search mailed Oct. 6, 2005, in related International Application No. PCT/US2005/017492, filed May 10, 2005.

International Preliminary Report on Patentability dated Jan. 9, 2007, in corresponding International Application No. PCT/US05/17492, filed May 10, 2005.

* cited by examiner

| ROMAJI TRANSLITERATIONS 102 | KANJI CHARACTERS 104 | ASSOCIATIONS 106 |
|---|---|---|
| ken | 刀 | Sword/Sabre/Blade/Bayonet/Sting/Clock Hand/Kill Bill/Jet Li |
| ken | 件 | Matter/Case/Item/Forms/Fact/Application |
| ken | 券 | Ticket/Coupon/Bond/Certificate/Speeding/Form/Concert/Traffic |
| ken | 県 | Prefecture/Official/Government/Region/Administration/Kyoto/Department |
| ken | 権 | Right/Morally Good/Power/Authority/Influence/Wrong/Privilege/Moon |
| ken | 験 | Test/Exam/School/Anxiety/Case/Grades |

FIG. 1

| ROMAJI TRANSLITERATIONS (202) | KANJI CHARACTERS (204) | ASSOCIATIONS (206) |
|---|---|---|
| kitai | 気 | Gas/Vapor/Air/Explode/CO2/Bhopal |
| kitai | 体 | Fuselage/Body/Airplane/Wreck/Airframe |
| kitai | 危 | Danger/Jeopardy/Distress/Fear/Keep Out/Godzilla |
| kitai | 望 | Hope/Expectation/Anticipation/Expectation/Wish/Spring/Dream/Cancer |

FIG. 2

| SYMBOL | ROMAJI | ASSOC. 1 | ASSOC. 2 | ASSOC. 3 | ASSOC. 4 | ASSOC. 5 | ASSOC. 6 | ASSOC. 7 | • • • | ASSOC. n |
|---|---|---|---|---|---|---|---|---|---|---|
| 望 | kitai | Hope | Anticipation | Expectation | Wish | Spring | Dream | Cancer | | |
| 危 | kitai | Danger | Jeopardy | Distress | Fear | Keep Out | Godzilla | | | |
| 体 | kitai | Fuselage | Body | Airplane | Airplane | Wreck | Airframe | | | |
| 気 | kitai | Gas | Vapor | Air | Car | Explode | $CO_2$ | | | |
| 刀 | ken | Sword | Sabre | Blade | Bayonet | Sting | Clock Hand | Kill Bill | | |
| 件 | ken | Matter | Case | Item | Form | Fact | Application | | | |
| 券 | ken | Ticket | Coupon | Bond | Certificate | Speeding | Form | Concert | | Traffic |
| 県 | ken | Prefecture | Official | Gov't | Region | Admin | Kyoto | Department | | |
| 権 | ken | Right | Power | Authority | Influence | Wrong | Privilege | | | Jet Li |
| 験 | ken | Test | Exam | School | Anxiety | Case | Grade | | | |
| • | | | | | | | | | | |
| • | | | | | | | | | | |
| • | | | | | | | | | | |

JAPANESE — 502
MANDARIN CHINESE — 504
CANTONESE CHINESE — 506
SHANGHAINESE CHINESE — 508

*FIG. 5*

COMPUTER-IMPLEMENTED METHODS AND SYSTEMS FOR ENTERING AND SEARCHING FOR NON-ROMAN-ALPHABET CHARACTERS AND RELATED SEARCH SYSTEMS

BACKGROUND OF THE INVENTION

1. Field of the Invention

The present invention pertains to computer-implemented methods and systems for entering Chinese and Japanese characters for documents and for Web and other data object, image, and symbolic object or concept searching.

2. Description of the Related Art

The basic problem associated with entering Japanese and Chinese character into a computer is simply that keyboards cannot be made sufficiently large so as to accommodate the several thousand characters one would find in a Japanese newspaper, let alone the approximately 40,000 characters needed for formal Chinese technical or governmental documents. The same issues also arise in other languages. In addition, the growth in the number of character-based (Chinese, Japanese, and some Korean) websites makes it extremely difficult to search them without adequate methods of entering such characters. Furthermore, even obtaining a character and searching for it does not mean that the specific instance of the character for which the search is being performed has been isolated. Other languages, such as Arabic or Hebrew, have characters or syntax and writing styles poorly adapted to manual entry by current methods. Suboptimal solutions exist, but none function well. Conventional search systems may return desired results, but they invariably return many times as many undesired results as they do desired results.

The Japanese favor speech entry, but problems, related to speech defects or impediments, accents, pronunciations, errors (one word or character substituted for another), dialects, second or subsequent language, remain. Most current speech recognition systems require a lengthy training period to enable the machine to accurately transcribe the user's speech. Moreover, it is often necessary to train the user to exercise proper diction to enable the machine to operate at an acceptable recognition level.

Turning first to the written form of the Japanese language, the oldest common method involves the user entering a keyboarded (Romaji, or phonetic transliteration of the Japanese characters using the Roman alphabet, or kana—the Japanese phonetic characters) phonetic representation of the desired character (or phrase, meaning a cluster of characters). All similarly pronounced characters will be shown on the screen and the user is then asked to pick from among the similarly pronounced characters presented on the display. This process is slow, tedious, and does not always yield the desired characters.

Recent solutions require the user to dictate spoken Japanese or Chinese, with a software/machine translation of the spoken word into characters. The user then must edit the result or repeat the speech or confirm the result. Current methods using speech, however, are believed to lack adequate speed, precision, and suitability for all potential users. Likewise, conventional methods that rely solely on keyboard methods to enter Romaji pronunciations are believed to be slow, cumbersome and counter-intuitive. Finally, these conventional methods often interrupt the user's train of thought by requiring selection of one among many candidate characters or by requiring the user to repeat his or her speech. Often, the user may not recognize the candidate characters and is, therefore, unable to select the proper character from among the candidate characters. Moreover, these methods often fail to enable the user to reliably select the desired characters in a timely manner.

These shortcomings also manifest themselves when attempting to enter non-Roman-alphabet characters into a Web search engine for the purpose of searching Web sites containing such characters. What are also needed, therefore, are methods and systems that enable users to easily enter non-Roman-alphabet characters into a search engine and to search on the entered characters.

SUMMARY OF THE INVENTION

According to an embodiment thereof, the present invention is a computer-implemented method for selecting a desired non-Roman-alphabet character from a set of non-Roman characters. The following uses of the word "association" all refer to associations in the mind of the specific user of this invention. The method may include steps of providing an association database that includes, for each non-Roman-alphabet character of the set, a Roman alphabet phonetic transliteration associated with each said non-Roman-alphabet character and a plurality of entries that are associated with each said non-Roman-alphabet character; receiving a phonetic transliteration of the desired non-Roman-alphabet character and at least one associated entry that is associated with the desired non-Roman-alphabet character; accessing the association database and identifying as candidate characters those characters of the set that are associated with the received phonetic transliteration and with the at least one received associated entry; if a number of candidate characters is greater than one, receiving additional associated entries and repeating the accessing and identifying step until a number of candidate characters is narrowed down to a single candidate character, and providing the single candidate character as the desired non-Roman-alphabet character.

According to further embodiments, one or more of the associated entries may be unrelated to a meaning of the desired character. One or more of the associated entries in the associated database may be user-provided. If a received associated entry is not currently associated with the desired character, the method may further include a step of associating the received associated entry to the desired character and storing the received associated entry in the association database. If a received associated entry is not currently in the association database, the method may further include carrying out a step of adding the received associated entry to the association database. The providing step may be carried out with the set of non-Roman characters including Japanese, Chinese, Korean, Hebrew and/or Arabic characters (for example). The providing step may be carried out with the association database including an association table having a plurality of rows, each row including a single non-Roman-alphabet character of the set, the Roman alphabet phonetic transliteration of the single non-Roman-alphabet character and a plurality of entries that may be associated with the single non-Roman-alphabet character. The receiving steps may be carried out via voice input, keyboard entry and/or machine vision (for example) to a computer coupled to the association database. A step of personalizing the association database may be carried out such that the association database contains, for each user, the associated entries received from each said user. The method may further include a step of ordering the associated entries in the association database such that those received associated entries that lead to the single candidate character in fewer iterations of the accessing and identifying steps may be ranked higher than the associated entries that lead to the single candidate character in a comparatively greater number of iterations of the accessing and identifying steps. The method may further include a step of searching a computer network (such as the Internet or a corporate intranet, for example) for documents that may include the provided non-Roman-alphabet character. The receiving step may be carried out with the associated entry being in the same language as the desired non-Roman-alphabet character. The receiving step may be carried out with the associated entry being in a different language than the desired non-Roman-alphabet character. The method may further include successively returning to the phonetic transliteration-receiving step to select a plurality of non-Roman-alphabet characters.

According to another embodiment thereof, the present invention is a machine-readable medium having data stored thereon representing sequences of instructions which, when executed by a computing device, causes the computing device to selecting a desired non-Roman-alphabet character from a set of non-Roman characters by carrying out steps including: providing an association database that may include, for each non-Roman-alphabet character of the set, a Roman alphabet phonetic (or Japanese kana or other phonetic alphabetic) transliteration associated with each said non-Roman-alphabet character and a plurality of entries that may be associated with each said non-Roman-alphabet character; receiving a phonetic transliteration of the desired non-Roman-alphabet character and at least one associated entry that is associated with the desired non-Roman-alphabet character; accessing the association database and identifying as candidate characters those characters of the set that may be associated with the received phonetic transliteration and with the at least one received associated entry; if a number of candidate characters is greater than one, receiving additional associated entries and repeating the accessing and identifying step until a number of candidate characters is narrowed down to a single candidate character, and providing the single candidate character as the desired non-Roman-alphabet character.

The present invention, according to still another embodiment thereof, is a computer system for selecting a desired non-Roman-alphabet character from a set of non-Roman characters, the computer system including at least one processor; at least one data storage device coupled to the at least one processor; a plurality of processes spawned by said at least one processor, the processes including processing logic for: providing an association database that may include, for each non-Roman-alphabet character of the set, a Roman alphabet phonetic transliteration associated with each said non-Roman-alphabet character and a plurality of entries that may be associated with each said non-Roman-alphabet character; receiving a phonetic transliteration of the desired non-Roman-alphabet character and at least one associated entry that is associated with the desired non-Roman-alphabet character; accessing the association database and identifying as candidate characters those characters of the set that may be associated with the received phonetic transliteration and with the at least one received associated entry; if a number of candidate characters is greater than one, receiving additional associated entries and repeating the accessing and identifying step until a number of candidate characters is narrowed down to a single candidate character, and providing the single candidate character as the desired non-Roman-alphabet character.

Yet another embodiment of the present invention is a computer-implemented method of searching for documents that may include one or more predetermined non-Roman-alphabet characters that may be unknown to the user. Such a method may include steps of providing a pronunciation of the desired non-Roman-alphabet character in any phonetic rendering (as, for example, Japanese kana or Korean non-Chinese style alphabet characters) or symbolic input (as, for example, sign language); providing at least one associated entry that the user associates with the desired non-Roman-alphabet character; causing a retrieval from an association database one ore more candidate characters whose pronunciation matches the provided pronunciation and that is associated one or more of the at least one associated entry; if a number of candidate characters is greater than one, providing additional associated entries and repeating the retrieval causing step until a single candidate character is retrieved, and causing a search to be carried out for documents that may include the single candidate character. It is expected that the use of associations will help to narrow the search to the desired instance of the character for which search is conducted, rather than dredge up all occurrences of that specific character.

According to further embodiments, in the pronunciation-providing step, the pronunciation may be a phonetic pronunciation (for example). In the associated entry-providing step, at least one of the associated entries may be unrelated to the (e.g., dictionary) meaning of the predetermined character and be an arbitrary association of a given user. If a provided associated entry is not currently associated with the predetermined character, the method may also include a step of associating the provided associated entry to the predetermined character and storing the received associated entry in the association database. If a provided associated entry is not currently in the association database, the method may include a step adding the provided associated entry to the association database. The pronunciation-providing step may be carried out with the non-Roman character being, for example, a Japanese, Chinese, Korean, Hebrew or an Arabic character, to name a few possible languages. The retrieval-causing step may be carried out with the association database including an association table having a plurality of rows, each row including a single different non-Roman-alphabet character, the Roman alphabet pronunciation of the single non-Roman-alphabet character and a plurality of entries that may be associated with the single non-Roman-alphabet character. The providing steps may be carried out via voice input, via keyboard entry and/or machine vision (for example) to a computer coupled to the association database. The method may further include a step of logging in such that the retrieval causing step causes a retrieval of the at least one candidate character from an association that is personalized to the logged in user. The search-causing step may cause a search of a computer network for the documents. The associated entry-providing step may be carried out with the associated entry being in a same or a different language than the predetermined non-Roman-alphabet character. The method may further include successively returning to the pronunciation-providing step to retrieve additional candidate characters for additional predetermined non-Roman-alphabet characters. The pronunciation in the pronunciation-providing step may be configured to use any phonetic alphabet. The retrieval-causing step may be configured to cause the retrieval of any computer-readable file or data, such as a Roman character, a non-Roman character, a picture or music, for example.

According to still another embodiment thereof, the present invention may be viewed as a computer-implemented method for a user to search for documents, pictures, symbols, concepts, or data objects (collectively referred to herein as "documents") across a computer network or on local storage within the computer being used for the search. The method may include steps of receiving a search term; receiving at least one associated entry, the at least one associated entry being related to the search term, consulting an association database, the association database storing a plurality of dictionary meanings and at least one associated entry for each dictionary meaning, each associated entry being related to its corresponding dictionary meaning; matching the received associated entry with one or more of the stored associated entries and corresponding dictionary meanings; searching the computer network for documents related to or containing the search term and the matched stored dictionary meanings and associated entries. The method may further include a step of adding the received at least one associated entry to the association database when the searching step is successful. The method may further include a step of prompting the user to provide additional information, such as a category, characteristic and/or membership, for example. The method may further include a step of receiving from the user an exclusionary associated entry such that the searching step does not search for documents including or related to one or more dictionary meanings of the search term corresponding to the received exclusionary associated entry.

BRIEF DESCRIPTION OF THE DRAWINGS

FIG. 1 is a table showing associations for a number of Kanji characters having a Romaji transliteration of "ken".

FIG. 2 is a table showing associations for a number of Kanji characters having a Romaji transliteration of "kitai".

FIG. 5 shows exemplary tables of the association database, according to an embodiment of the present invention.

DESCRIPTION OF THE INVENTION

Figure 3:
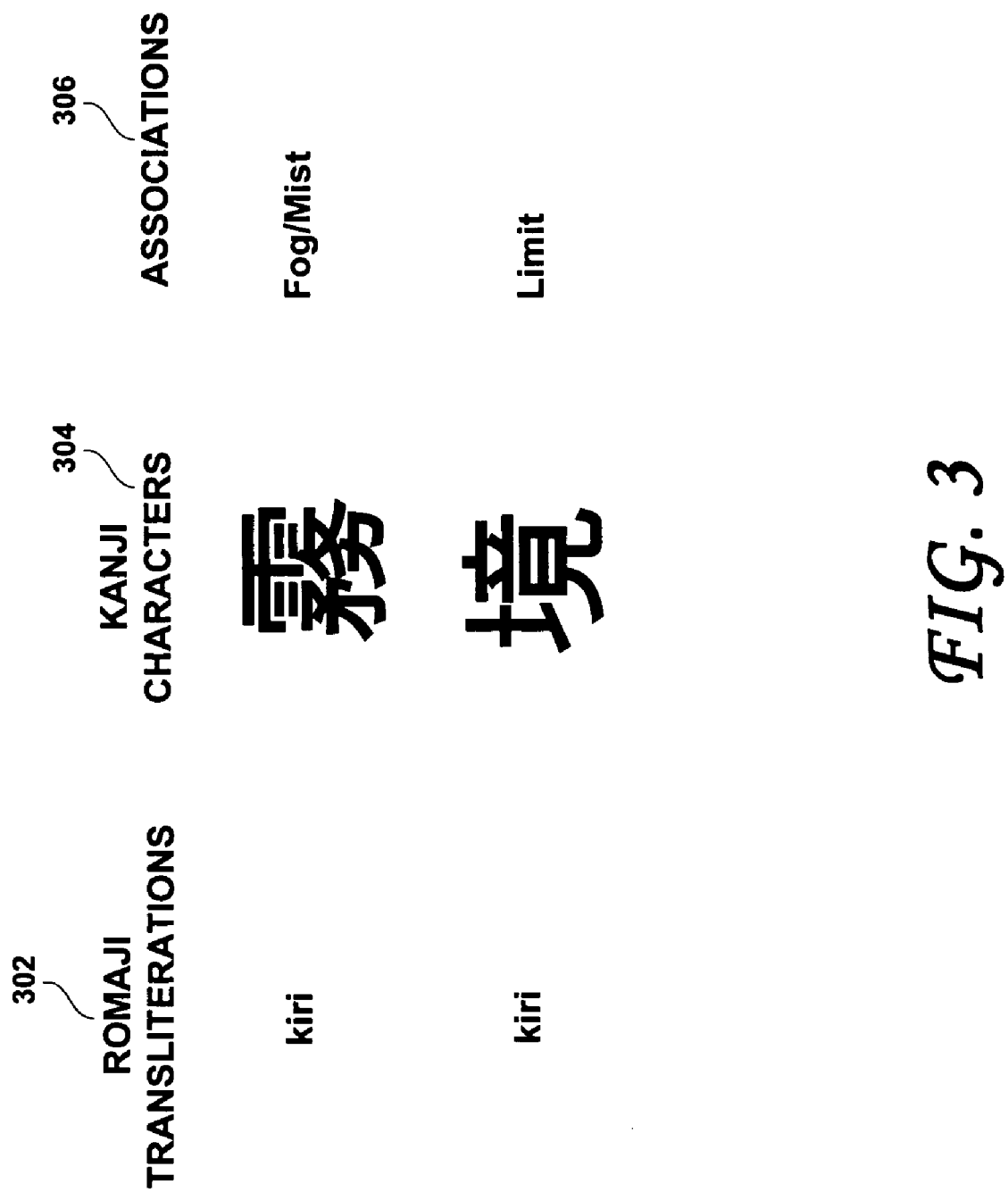
FIG. 3 is a table showing associations for a number of Kanji characters having a Romaji transliteration of "kiri".

Even native speakers of languages whose written forms do not rely on the Roman alphabet, such as Japanese and the many Chinese dialects, typically recognize a far greater number of characters by sight than they are able to manually reproduce. Embodiments of the present invention enable a unique selection of a desired non-Roman character even when the user has but a dim, vague memory of what the desired character looks like. In so doing, embodiments of the present invention enable users to display an apparent greater command and skill in writing of characters than they actually possess by providing a phonetic pronunciation and one or more associated entries. Such entries may be made through a series of keystrokes, spoken words and/or any other computer-perceptible form of input (such as machine vision, for example). In so doing, embodiments of the present invention help users to successfully input a greater number of characters than the person really knows (or is really able to fashion by reconstructing all the strokes). Embodiments of the present invention may find utility in the composition of documents, as well as in search engines (including, for example, Google® , Yahoo® and the like) to scan and search web sites and documents published using a non-Roman-alphabet-driven written form.

In the drawings and the written portion of the description hereunder, the emphasis is on the Kanji written Japanese form. However, embodiments of the present invention are equally well applicable to all other written forms of expression that do not rely upon the Roman alphabet in which this text is written. For example, embodiments of the present invention are readily extensible to the many Chinese dialects, to Arabic forms and to Hebrew, for example. Therefore, the claimed embodiments of the invention are expressly intended to encompass all such written forms of expression that do not rely upon the Roman alphabet and, for searches, particular instances of words in any character system, including but not limited to Roman, together with their associated words in Roman or any phonetic rendering.

Turning now the drawings, FIG. 1 is a table showing associations for a number of Kanji characters having a Romaji transliteration of "ken". In FIG. 1, the Romaji transliterations are shown at 102, the Kanji characters are shown in the column referred to by numeral 104, and the associations are found at 106. These characters are known as "dougigo" or similarly pronounced Japanese characters. In FIG. 1, "ken" is the Roman character version of how the Kanji characters 104 are pronounced; that is, their transliteration. Adjacent each Kanji character 104 are a number of (in this embodiment, English language) entries (in this example, words) that are associated with the Kanji characters 104 and whose meaning are related to the Kanji character. The associations 106 may be in any language, including the spoken language corresponding to the language of the characters 104. For example, the associations 106 may be in Japanese. The associated entries and meanings 106 may, according to embodiments of the present invention, include words and concepts that are familiar to native speakers of the language (in this case, Japanese), who share a culture and the resulting word/character associations. Therefore, according to an embodiment of the present invention, the associated entries 106 may include not only words contained in the corresponding dictionary entry for a given character, but also other words, concepts and/or short phrases, sounds (for example) that a typical user may associate with the corresponding Kanji character. For example, although the fifth row in FIG. 1 shows a Kanji character 108 whose dictionary entry is "right" and "morally good", the list of associated entries 106 for the symbol 108 in the fifth row of FIG. 1 whose Romaji transliteration is "ken" may also include other words, concepts and/or short phrases that a user might associate with that character. For example, entries that may be associated with the Kanji character 108 may also include the words "Power", "Authority", "Influence", "Wrong" and "Privilege", even though these words may each have their own Kanji symbol in the Japanese language. According to embodiments of the present invention, the entries that are associated with a given non-Roman-alphabet character may be an exact English language counterpart to the character, may have a meaning that may be closely related to the underlying character, may have a meaning that is only distantly related to the underlying character or may be completely unrelated to the accepted meaning of the non-Roman-alphabet character. According to another aspect of the present invention, the associated entries need not be words at all, but may be a phonetic representation of what the user associates with the desired character and/or any machine perceptible user manifestation that may be stored and accessed in a machine-readable medium. For example, the associated entry may include a representation of a sound, movement or gesture made by the user, as long as that user manifestation may be represented electronically. Indeed, speech, gestures, sign language, keyboard entry, speech with raised or lowered tones, accents, emphasis and/or other utterances or actions may be captured, recorded, and used as associated entries to find the desired character or characters. The building of empirically based association tables from diverse keyboard, speech, and other inputs into a relational association database 402 enables association with specific characters. By using such inputs, the user may rapidly select a desired character and that character may readily be used to construct a document or form the basis of a search for one or more documents containing the desired character(s). A document, according to the present inventions, may include any computer readable file such as a text document or an XML or HTML document (such as a Web page, for example) generated by a server (such as a Web server) in response to request from a client, such as a HTTP request. Such an HTML document may include references to images and/or other rich data sources that may be resolved at the client side and the client may have to issue additional requests to obtain the embedded images, sound, JavaScript code snippets etc. Unlike traditional speech-oriented character selection by translation, and unlike traditional keyboard selection based on pronunciation, embodiments of the present invention leverage each type of user input as another factor in the selection of the desired character. The present methods may be repeated to build a string of characters for document authoring or more complex searching.

According to embodiments of the present invention, it is sufficient that at least one user has formed an association in his or her mind between the character (such as the kanji character 108 in FIG. 1) and the associated entry. For example, if the user associates the word "Moon" with the character 108, that word may be associated with the character 108, even thought the word "Moon" is apparently unrelated to the character 108.

Similarly, the Kanji character 208 in the first row of FIG. 2 may be defined in a dictionary as meaning "Gas" or "Vapor". Therefore, these meanings may be listed as associated entries, along with the Romaji transliteration "kitai" of the character 208. However, a user may form other associations with this Kanji character 208. Some of these associations may be shared by others that have experienced the same culture, upbringing, popular culture, and education, while other ones of these associations may be shared by only a small group of similarly situated persons or even by a single person. For example, the words "Air", "Explode", "CO2" or "Bhopal" may be associated to the character 208 in many users' minds. When searching for the character 208, they may recall the Romaji transliteration thereof "kitai", and be able to provide one or more of the associated entries corresponding thereto. FIG. 3 shows additional Kanji characters, their shared respective Romaji transliterations ("kiri" in this case) and a number of entries that may be associated therewith.

Embodiments of the present invention include an association database 402 including, for example, a relational database management system RDMS from Oracle Corporation. The database 402 may store a set of non-Roman-alphabet characters, their respective phonetic pronunciation or other transliteration and one or more associated entries. In the embodiment developed herein, the non-Roman-alphabet characters stored in the database 402 are Kanji characters and the respective transliterations are Romaji transliterations. Other embodiments include other non-Roman-alphabet characters and other pronunciations or transliterations.

Figure 4:
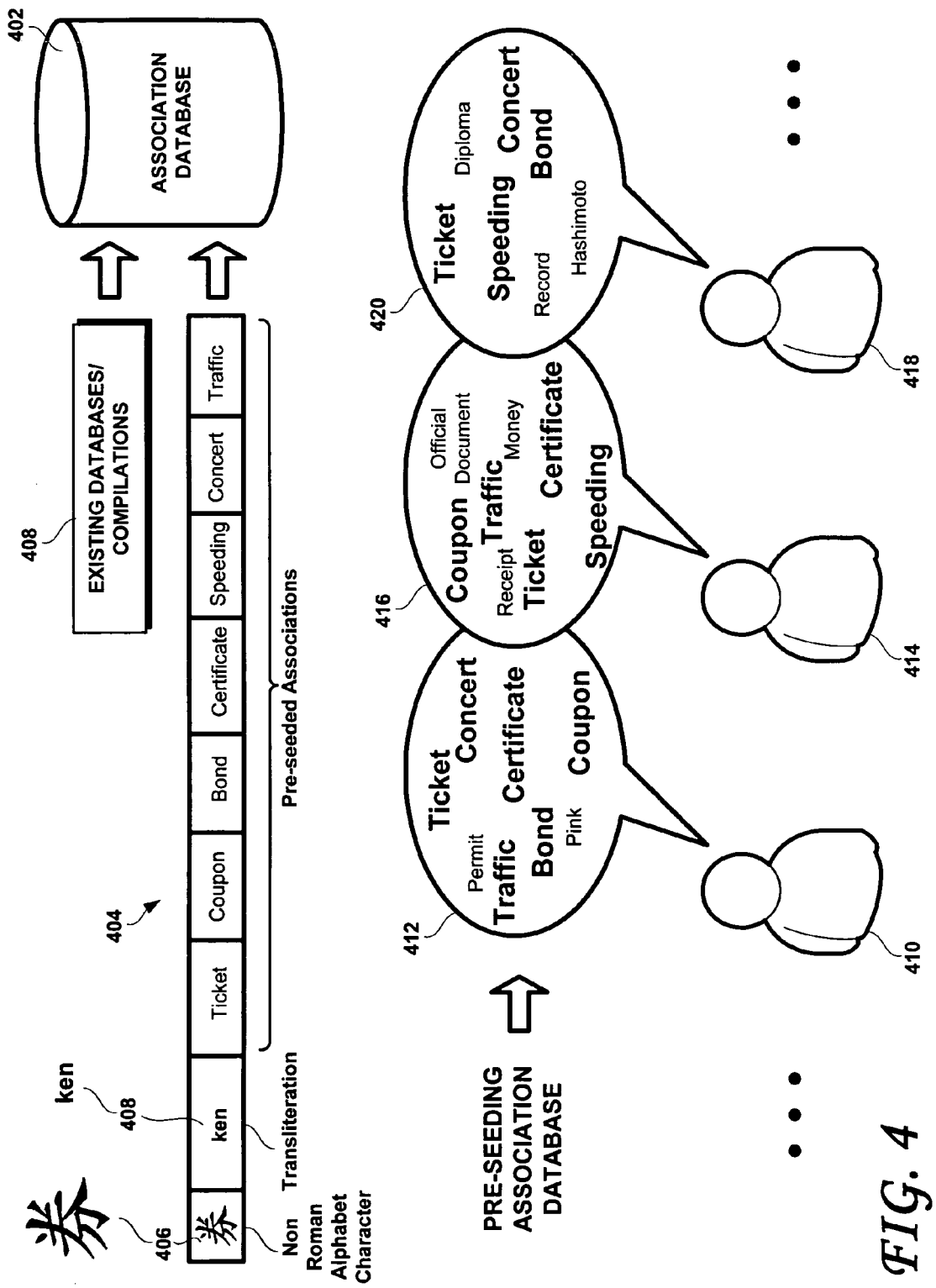
FIG. 4 shows an exemplary manner in which the association database may be pre-seeded, according to an embodiment of the present invention.

FIG. 4 shows an exemplary manner in which the association database 402 may be pre-seeded, according to an embodiment of the present invention. The database 402 may include one or more tables that include a plurality of records. A representative record is shown at 404. Each record may be stored as a row in the database 402. According to an embodiment of the present invention, the database 402 may be pre-seeded with one or more sets of non-Roman characters (for example, the 40,000 or so Kanji characters), their Romaji transliterations (or phonetic pronunciation, for example), and one or more associated entries for each Kanji character-Romaji transliteration pair. To pre-seed the association database 402, existing databases, compilations and/or dictionaries may be of use, as suggested at 408. Embodiments of the present invention also call for pre-seeding the database 402 with one or more associated entries for each of the Kanji characters. As shown in FIG. 4, this pre-seeding process may include interviewing a plurality of participants that are believed to be more or less representative (in terms of education, cultural background for example) of the expected users of the invention. Such participants are shown in FIG. 4 at reference numerals 410, 414 and 418. For example, the interviewing process may include showing the participants the Kanji characters and the Romaji transliteration thereof and asking them to free-associate on each Kanji character. In the example of FIG. 4, the Kanji character 406 may be listed in a Japanese-English dictionary as corresponding to the words "Ticket", "Coupon", "Bond" and "Certificate". Each of these common meaning of the Kanji character 406 may be included in the record 404 as a pre-seeded associated entry, along with the transliteration "ken". According to an embodiment of the present invention, one or more of the records of the database 402 may include additional associated entries in each record that may be selected as follows. Each participant 410-418 may be asked to free-associate with the Kanji character 406. As a result, the participants may conjure up a number of different associations, as suggested by the bubbles 412, 416 and 420. For example, upon being shown the character 406 and seeing/hearing the transliteration "ken", participant 410 may associate the words "Ticket", "Permit", "Certificate", "Bond", "Pink" and "Coupon" with this character. These associations form candidate associations. The candidate associations of the other participants 414 and 418 are also shown. Those candidate associations that are matched across participants are shown in bold. According to an embodiment of the present invention, those candidate associations that are made by the most participants may be selected as additional pre-seeded associated entries and included in the record 404. For example, the participants associated the words "Certificate", "Bond", "Pink" and "Coupon" with the character 406, which candidate associations may already have been included as associated words in the record 404.

These need not be duplicated in the record 404. However, more than one participant associated the words "Speeding", "Concert", "Traffic" with the character 406. If a sufficient (and selectable) number of participants responded with these associations, the associations may also be included in the record for the character 406, as shown in FIG. 1. The manner in which candidate associations are selected to be included in the record 404 as associated entries is entirely selectable. For example, a majority algorithm may be used to determine which of the candidate associations are selected to be included in each record.

Note that participant 410, in response to the request for free associations, associated the words "Permit" and "Pink" with the character 406, in addition to the words "Ticket", "Bond", "Certificate" and "Coupon". However, since these candidate associations were not shared by a sufficient number of participants, these candidate associations were not selected for inclusion as associated entries in the record 404. Likewise, the candidate associations "Receipt", "Official Document" and "Money" were not shared by a sufficient number of participants and thus not selected for inclusion as associated entries in the record 404. Similarly, the words "Record", "Hashimoto" and "Diploma" conjured up by participant 418 were not selected either. Note that, although those entries may not be included in the general database for seeding purposes, they would be retained in a user-specific portion of the database for the use of the person who entered them. The intention here is to accumulate any attempted candidate associations into either the general database or the database as seen just by the specific user who employed the candidate associations, should there be a central database with a number of users. Each logged in user of the database, then, would have a different set of associations available; the common set of associations would be that originally seeded plus the algorithmically selected additional associations added to the original seeded store, and, finally, the user's own idiosyncratic associations not tabbed by the algorithm for inclusion in the general database.

From the foregoing, it may be appreciated that the associated entries need not bear a direct semantic relation to the dictionary or commonly understood meaning of the character 406. For inclusion in the record 404, suffice it that a sufficient number of participants cited the candidate association as being somehow related in their minds to the character 406. This is how, for example, the candidate association "Concert" came to be included as an associated entry in the record 404.

FIG. 5 shows exemplary association tables of the association database 402, according to an embodiment of the present invention. Four tables are shown in FIG. 5. The first such table 502 is a Japanese language table, the second table 504 is a Mandarin Chinese table, the third table 506 is a Cantonese Chinese language table and the fourth table 508 is a Shanghainese Chinese language table. In practice, only one such association table may be included in the association database 402 or many more such association tables may be included therein. For example, the association tables may be organized as is the association table 502, but the tables need not be so organized. As shown in FIG. 5 and according to an embodiment of the present invention, each row of the table 502 is a record and each record includes a plurality of columns. The first column may store the non-Roman-alphabet character (in this case, a Kanji character) or a code corresponding to the character (such as a 2-byte word corresponding to one of the 40,000 or so Kanji characters, for example). Another column may store the Romaji transliteration of the character or some other phonetic pronunciation thereof, for example. Each record may then include one or more associated entries that may be selected, for example, in the manner detailed relative to FIG. 4 and as described hereafter. It is understood that FIG. 5 is but a conceptual illustration and that the physical organization of the association tables within the association database 402 need not be as shown in FIG. 5, but may be changed as necessary to optimize efficiency or other requirements.

There are many Chinese dialects, but only one general list of written Chinese characters, although given characters may have alternative traditional or modern short forms. In either case, they are the same regardless of the dialect. One could even use written Chinese characters to represent American Sign Language; the characters are not necessarily related to specific phonetic counterparts. Therefore, to enable embodiments of the present invention to be useful to speakers of diverse dialects, it is necessary to provide association tables to accommodate speakers of each of these specific dialects for which this invention is implemented. For example, although the Chinese written characters may be shared across all Chinese language association tables, the Roman alphabet transliterations thereof may be different, as may be the entries associated with each of these characters. Indeed, the associated entries may be different in each of the Chinese language dialect association tables not only because differences across dialects, but also because of the different cultural, educational and social backgrounds of the native speakers of such dialects and of the anticipated users of the application embodying aspects of the present invention.

It is understood that additional tables may be provided and populated for languages others than Japanese and the many Chinese dialects. As noted above, association tables may be developed for Arabic languages, Hebrew, Korean or any other language that uses non-Roman-alphabet characters in its written form.

Figure 6:
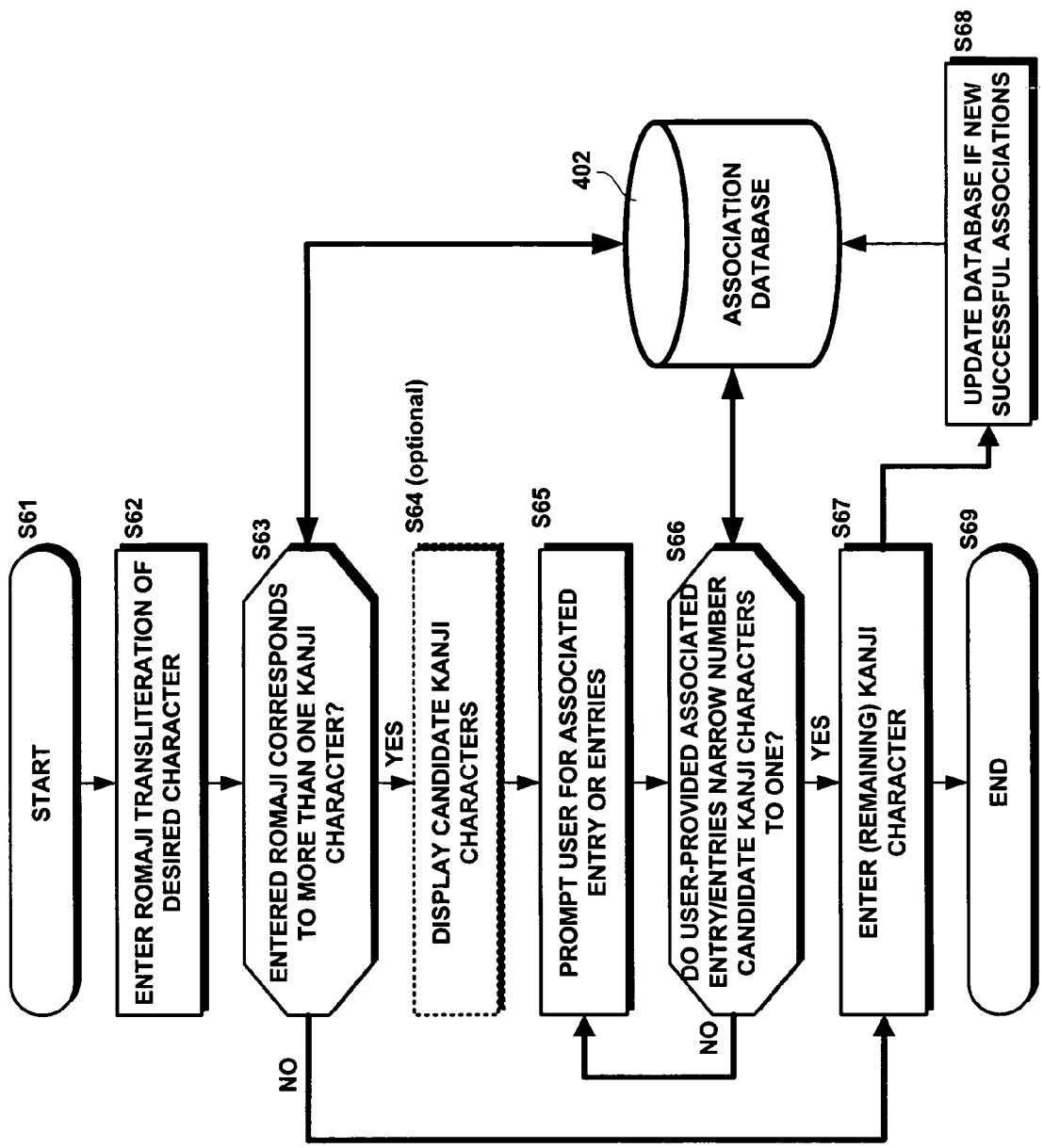
FIG. 6 is a flowchart of a method of entering characters, according to an embodiment of the present invention.

FIG. 6 is a flowchart of a method for selecting a desired non-Roman-alphabet character from a set of non-Roman characters, according to an embodiment of the present invention. The method begins at S61, whereupon the user may be prompted to enter a Roman alphabet transliteration (or phonetic pronunciation, for example) of the desired non-Roman-alphabet character. For purposes of illustration, the method is discussed herein with respect to Japanese Kanji characters, although it is understood that the present inventions are not limited thereto. Step S62, therefore, prompts the user to enter (or otherwise provide) the computer running an application embodying aspects of the present invention with a Romaji transliteration of the desired Kanji character. Embodiments of the present invention are not limited to user input via a computer keyboard, but may be configured to user input (including, for example, the transliterations, phonetic pronunciation and/or associated entries) in any form such as the spoken word (using voice recognition techniques), written form (using optical character recognition techniques), visual input (using machine vision and pattern recognition techniques, for example), or virtually any data entry modality that is computer perceptible. For example, the computer embodying embodiments of the present invention may be provided with means for recognizing sign language, hand or body gestures, to name a few possibilities. Embodiments of the present invention may be adapted to operate with the many means of machine interaction developed for those with physical or mental impairments, for example.

Having entered the Romaji transliteration of the desired Kanji character as called for by step S62, it is then determined whether the entered Romaji transliteration corresponds to any Kanji character. If not, the user may be prompted to try again and enter another Romaji transliteration or a variation of the previously entered one. If, however, as shown at step S63, the entered Romaji transliteration corresponds to only one Kanji character, the method proceeds to Step S67, where the sole Kanji character is entered. A user confirmation step may be added prior to step S67 to confirm with the user that the single Kanji character provided in response to the user-provided Romaji transliteration is the desired (e.g., correct) one. If the provided Kanji character is not the desired character, the user may be returned to step S62 to try again. Also, the user may try again with different associations if, in a search, the correct character but the wrong usage is returned.

If, however, the entered Romaji transliteration corresponds to more than one Kanji character (as is the case with the transliterations "ken", "kitai" and "kiri" of FIGS. 1-3), the methods may proceed from step S63 to step S64. There, the computer system may display or otherwise provide the candidate Kanji characters to the user. Step S64, however, may be omitted, as displaying a plurality of candidate characters may prove to be too distracting for the user as he or she is composing and providing associated entries. It is to be noted that the associated entries, as described herein and as shown in the drawings, need not be words in English as shown. For a native speaker of Japanese, for example, the associated entries may be phonetic (kana) forms of the associations the user makes with the desired character. The associated entries, therefore, may be defined in any language and/or any modality, as detailed below. The candidate characters are those Kanji characters that correspond to the Romaji transliteration provided by the user. For example, the characters shown in FIG. 1 may be displayed for the user as candidate Kanji characters in response to the user entering the Romaji transliteration "ken". The user may then be given the opportunity to directly select one of the candidate Kanji characters as the desired Kanji character. However, embodiments of the present invention enable the user to provide the computer with one or more associated entries in an attempt to narrow down the field of candidate Kanji characters to a single one. As shown in step S65, therefore, the computer may prompt the user for one or more associated entries, such as those shown in FIGS. 4 and 5, for example. In step S66, it is determined whether the provided associated entries do, in fact, narrow the field of candidate Kanji characters to a single one. If not, the user may be prompted to provide one or more additional associated entries and the method may revert back to step S65. If only a single candidate Kanji character remains, the sole remaining candidate Kanji character should be the Kanji character that the user seeks, as suggested by step S67. If not, the process may be repeated. The method ends at Step S69.

Embodiments of the present invention are not limited to the case wherein the association tables (see FIG. 5) are pre-seeded—that is, populated with associated entries chosen by others in the manner shown in FIG. 4, for example. Indeed, embodiments of the present invention may gain enhanced functionality by enabling the non-Roman-alphabet character selection systems described herein to learn from its users. Indeed, the non-Roman-alphabet character selection methods and systems described herein may not only learn from its users in the aggregate, but may also be configured to learn and adapt to individual users. This is desirable, as no two users are believed to have identical backgrounds. In turn, differing backgrounds (educational, social, cultural, etc.) necessarily lead users to form different associations and mental images and to, therefore, associate different entries with different characters. Therefore, the association of a given entry or word with a given Kanji character that might make sense and be intuitive to one user might not (and likely will not) make sense or be intuitive to another user, even one that may be similarly situated.

Returning briefly to FIG. 4, the participants used to pre-seed the association database shown at 410, 414 and 418 shared a number of associations, such as "Certificate" and "Speeding" for the Romaji transliteration "ken". However, participant 418 associated "Hashimoto" with the Kanji character 406 and the transliteration "ken" 408, and did so for reasons probably known only to him or her. Likewise for the associated word "Pink" provided by participant 410 for the same Kanji character 406. While these associations did not meet the selection criteria for inclusion as a pre-seeded associated entry in the association database 402, these associations nevertheless apparently made perfect sense to participants 410, 418. Therefore, embodiments of the present invention advantageously enable the association tables (see FIG. 5) to be customized to each user of the present character selection system. These users may then recall those same associations to select a desired character.

Figure 7:
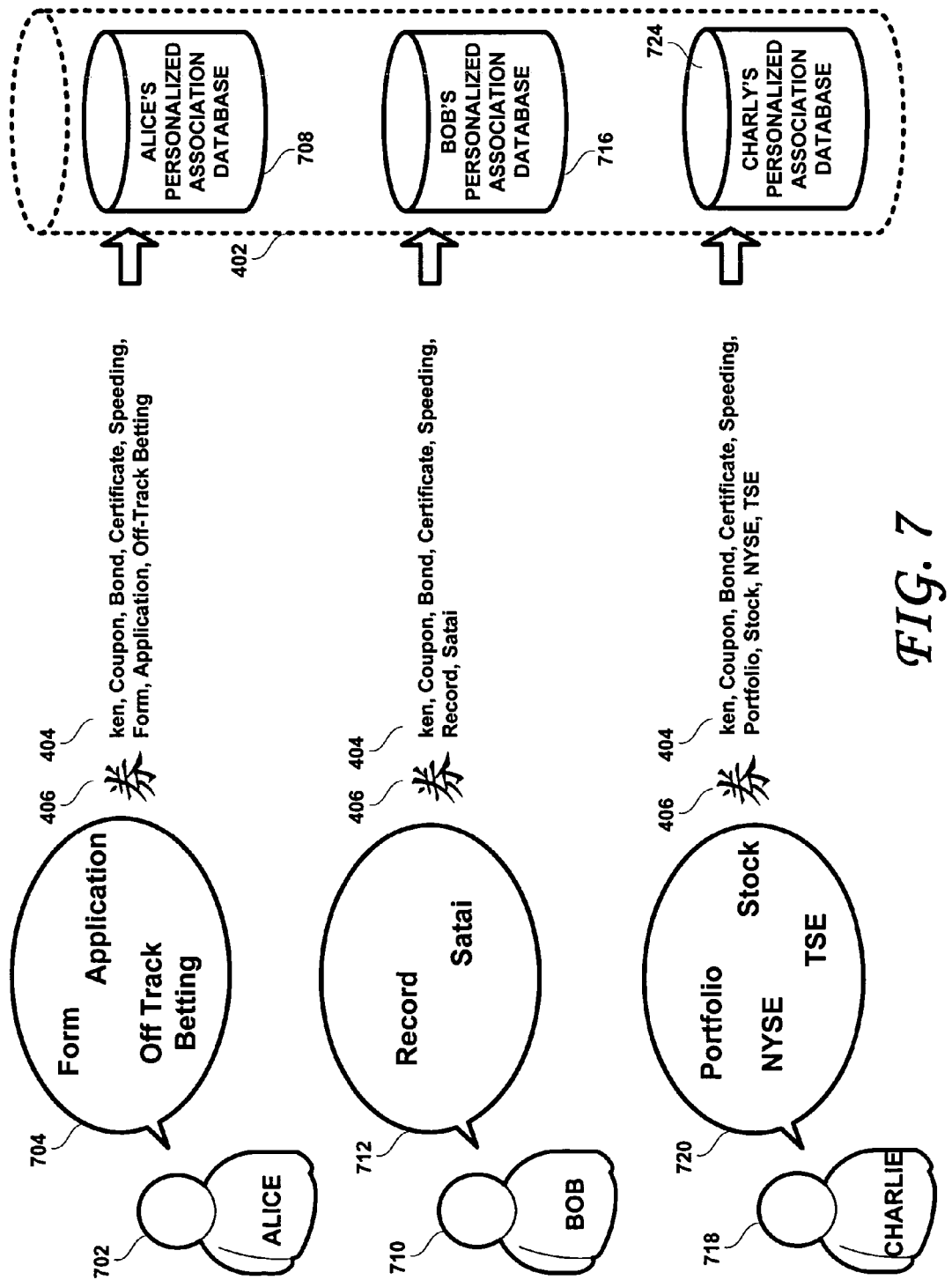
FIG. 7 shows an exemplary manner in which the association database may be personalized, according to an embodiment of the present invention.

FIG. 7 shows an exemplary manner in which the association database 402 may be personalized to each user of the present character selection methods and systems, according to an embodiment of the present invention. Three users are shown; namely Alice, user 702, Bob, user 710 and Charlie, user 718. According to an embodiment of the present invention, the association database 402 may be pre-seed in the manner shown and described relative to FIG. 4. The associated database 402, moreover, may be extended by including therein-associated entries provided by its users. As shown, the record for the character 406 for Alice may include, in addition to the pre-seeded associated entries, the entries that Alice associates with the character 406 and/or the transliteration 404. As shown at 704, these associated entries that Alice associates with the character 406 are "Form", "Application" and "Off-Track Betting". These user-specific associations, therefore, would be included in the record for the character 406 in the association database 402. This association database 402, therefore, may be personalized as shown at 708 with the associations that Alice makes when presented with the character 406. The present character selection methods and systems, therefore, may include a training component in which each user trains the system to associate selected entries to selected characters. User 710, in this manner, may associate the entries "Record" and "Satai" with the same Kanji character 406, as shown at 712. For example, the associated entry "Satai" may be useful only to Bob, user 710, and not to any other user. However, this associated entry "Satai" may be the most effective association for Bob, as this may be the word that Bob associates most closely with the character 406, regardless of the reason behind such an association. User 718, Charlie, may associate finance-related terms with the character 406, and this is reflected in his choice of entries to associate with the character 406, as shown at 720. These individual associations are then incorporated into the users' individual personalized association databases, as shown at reference numerals 708, 716 and 724. These may be separate databases, or integrated into the association database 402. A login procedure (for example) may be implemented to enable the system to distinguish between users.

According to another embodiment of the present invention, only a single association database 402 may be provided for a plurality of users. In that case, for example, the associated entries or pronunciations may be ordered for each user, with the most successful associated entries (i.e., associated entries that result in the selection of a single character or that lead to the successful selection of the desired character using the least number of associated entries) appearing before less successful ones. Also, the associated entries may be ordered to enable efficient binary searches within the association database. According to another embodiment, only those associated entries that are used often and/or lead to a successful selection of the desired character may remain in the database. Those associated entries that are not used or do not efficiently lead to the selection of a desired character may be culled from the record in the association database for the desired character. In this manner, the association database 402 may eventually come to be populated only or predominantly by the user's favorite associations—that is, by the most successful associated entries. Note that the association database 402 may be further ordered such that the transliterations themselves may be put into a sort order such that they may be subject to a binary search. All entries in the association table 402 may be indexed for rapid access.

By monitoring the users' patterns of use, embodiments of the present invention may predict the users' choices and enhance performance of the character selection process. By modifying the database 402 as detailed above, the association database 402 may become highly individualized after only a short period of time (e.g., a few weeks of heavy use). The implementation of stored user profiles enable individual users to access their own "individualized" association databases 402, such as suggested at 708, 716 and 724 in FIG. 7.

Embodiments of the present invention may include a discrete training component, as described relative to FIG. 4. However, embodiments of the present invention also include a more integrated training functionality that does not rely upon discrete training sessions. Indeed, the present character selection systems and methods may be configured to, in effect, learn from a user's failed associations. For example, when the user provides associated entries to the system responsive to the prompt in step S65, he or she may well provide associated entries that are not present in the association database for any of the Kanji characters. In the immediate, such provided associated entries are not effective in narrowing the field of candidate Kanji characters, as the system cannot match the provided associated entries to any record in the association database 402. As the answer to step S66 is then "No", the system reverts back to step S65 to prompt the user to provide one or more additional associated entries. Eventually, the user should provide the system with associated entries that do, in fact, narrow the field of candidate characters to a single one, which becomes the selected and desired Kanji character in step S67. Since the process was successful in choosing a single Kanji character using the user-provided associated entries, the associated database 402 may be updated to include those user-provided associated entries that were not previously stored in the association database, as shown at step S68. These new associated entries may then be stored in the record corresponding to the Kanji character selected in Step S67. The next time the user attempts to select the same Kanji character, the newly added associated entries may be effective in choosing the desired Kanji character or at least in narrowing the field (narrowing the number) of candidate Kanji characters. In a searching situation, the user would be more likely, given the associations used, to find the desired references determined by the user's phonetic rendering and provided associations.

As the tables in the association database 402 may have a number of associated entries for each Kanji character, it is foreseeable that some associated entries will be common to more than one record; that is, associated with more than one Kanji character. In that case, the number of candidate characters (that may or may not be provided to the user) is greater than one, and represents the number of characters whose records contain the common associated entry. To resolve this and to winnow the number of candidate characters to one, the user may provide one or more additional associated entries, which should reduce the number of records containing such common associated entries. Very quickly, that number should be reduced to a single candidate character as the user provides additional associated entries and those entries are applied to an ever-shrinking universe of candidate characters.

Figure 8:
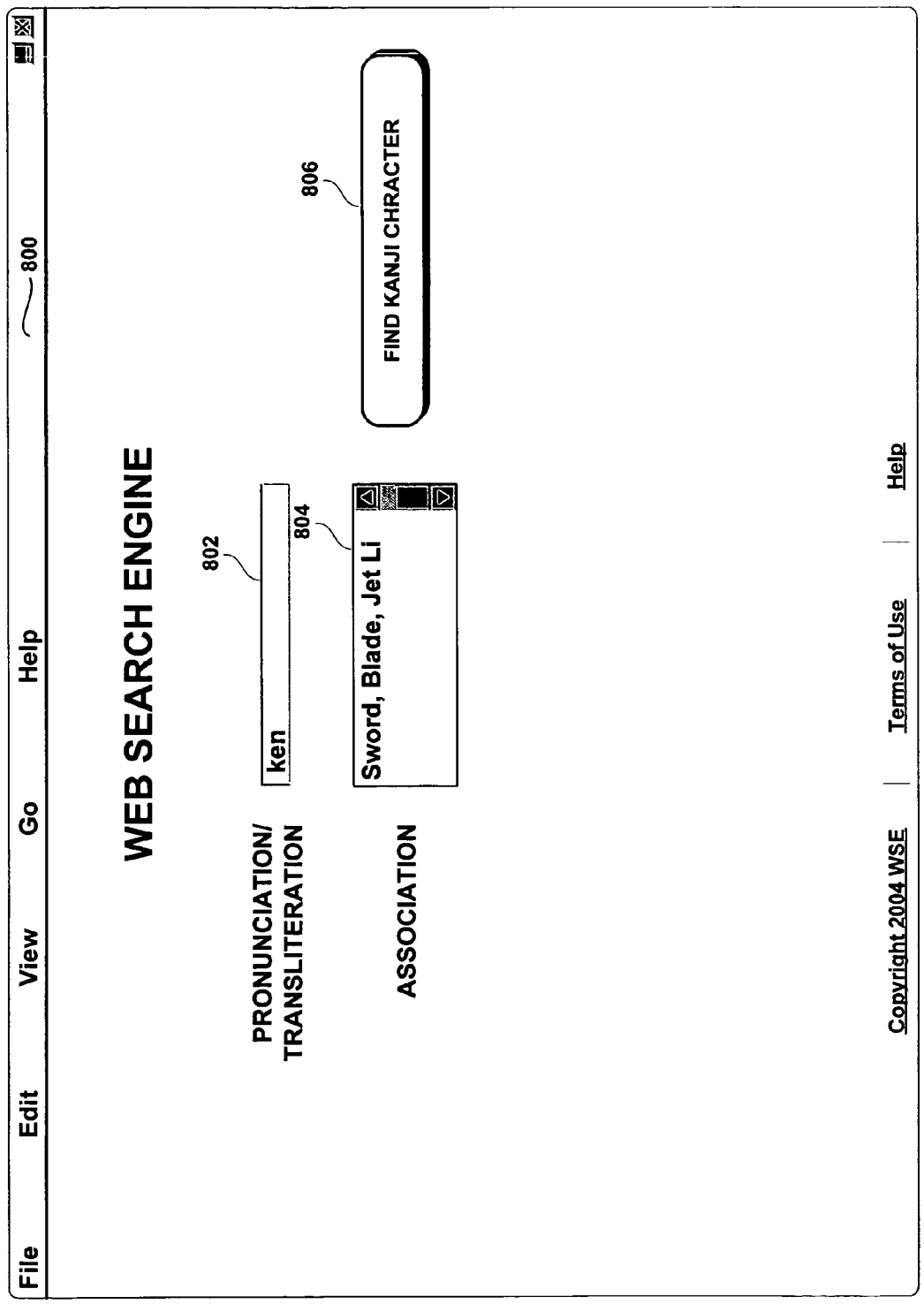
FIG. 8 shows an exemplary search engine employing an embodiment of the present invention.
Figure 9:
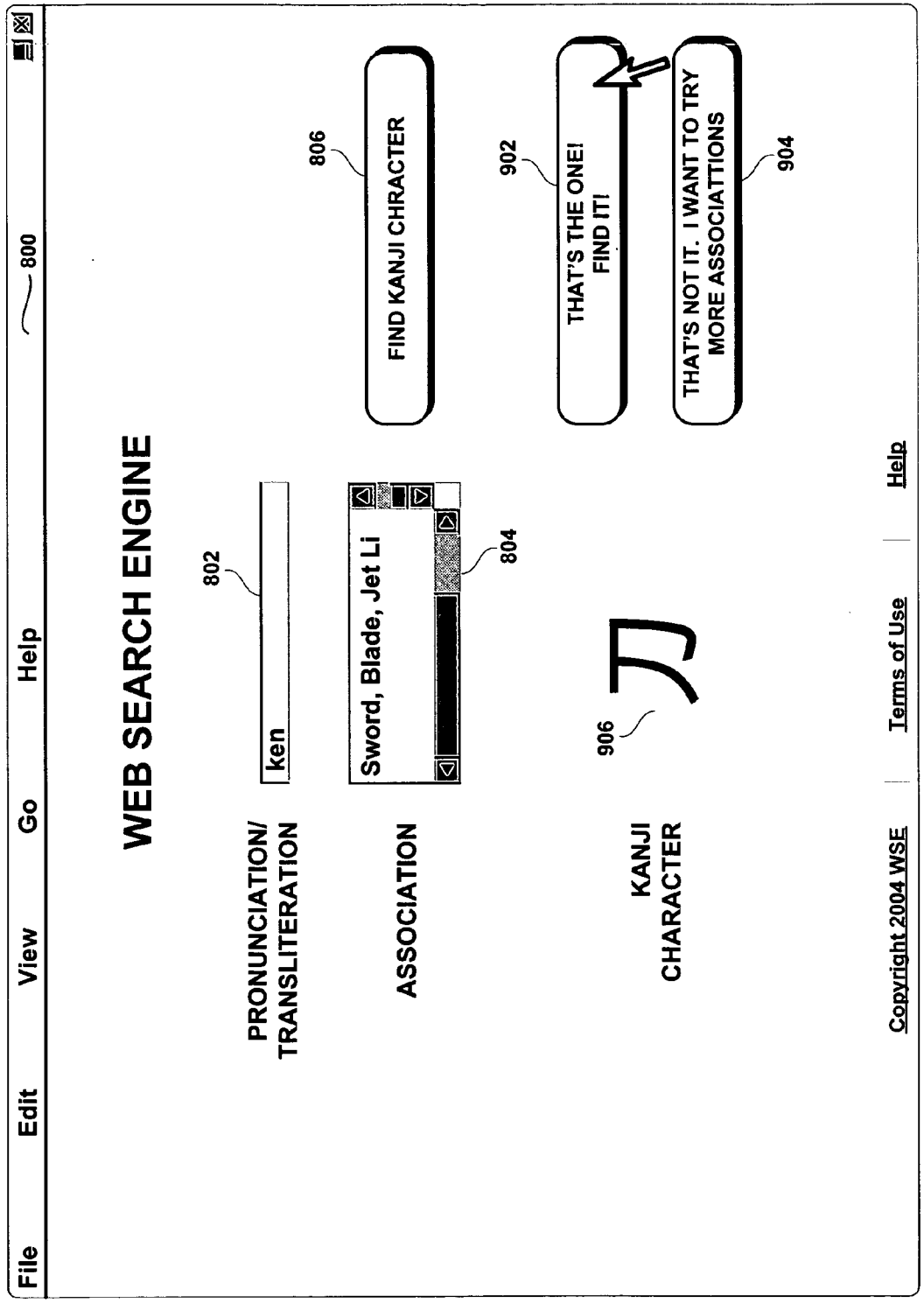
FIG. 9 shows the result returned by the search engine of FIG. 7, according to an embodiment of the present invention.

Embodiments of the present invention may be configured as a search engine or may be configured to supplement and augment existing searching technologies by increasing the efficacy of the search and by returning results that are more relevant to the user. FIG. 8 shows an exemplary and illustrative search engine employing an embodiment of the present invention. The search engine may be deployed as or incorporated within an enterprise network search engine or as a Web search engine, for example. The search may be of documents, database entries, labels or text attached to pictures, words, characters, pictures, or data objects of any description, collectively referred to herein as "documents". As shown in the implementation of the user interface shown in FIG. 8, the user may be prompted at 802, through a standard browser (for example) 800, to enter a pronunciation (which may be a phonetic pronunciation, for example) or a transliteration of the desired non-Roman-alphabet character, as discussed above. The user may also be prompted to enter one or more associated entries into the text box 804. In this case, the transliteration entered by the user is "ken" and the associated entries entered by the user in the text box 804 are "Sword", "Blade" and "Jet Li". It is to be understood that although the associated entries are shown herein in the English language, the associated entries may be entered in any language, including the language of the desired character (Japanese, in this case). Once the user has finished entering both the transliteration and the associated entries, the user may click or otherwise select the button 806 that bears the exemplary text "Find Kanji Character". Assuming that the entered transliteration and the entered associated entries correspond to a single candidate character, the exemplary screen of FIG. 9 may appear. Responsive to the user's input, the search engine may search the association database for Kanji characters contained in records containing the user-input transliteration and associated entries. In this case, a sole candidate Kanji character 906 is returned. The user may then accept that character and instruct the search engine at 902 to find instances of the character across the network (such as the Internet, for example) or may decide to add additional associated entries in the text box 804 or substitute new associated entries for those previously contained therein by selecting the button 904. Alternatively still, the user may be presented with more than one candidate characters and may, instead of providing additional associated entries, simply point to or otherwise select the desired character from among those presented, provided the user recognizes the character that he or she seeks. As noted above, many users recognize a great many more characters than they are able to reproduce. Embodiments of the present invention leverage just such abilities.

Alternatively, instead of searching on a single character, the user may iteratively use the methods described herein to construct a search string of such (Kanji or other) characters to use in searching character-based web sites and/or corporate intranets, for example. Other uses of embodiments of the present invention may include identifying items for Web-based auctions to efficiently match buyers and sellers.

Embodiments of the present invention provide an easily mastered, performant, and flexible methods and systems of accessing specific non-Roman-alphabet characters (such as Japanese and Chinese characters, for example) for purposes of creating documents, for designating searches, and/or for control of and contribution to application programs. Embodiments of the present invention can accommodate a wide variety of databases, all with associated characters. For example, although Chinese is a single written language with many spoken languages, an association database may be structured so that common characters may be associated with more than one dialect. For example, Creole (combination of dialects from two or more languages) may be used to access the commonly understood but differently pronounced characters of the constituent languages. Unlike conventional means of character access, embodiments of the present invention may be embedded in the very applications sold to software purchasers and need not be linked to any particular hardware.

The "context" of a search item and how that context might be established is the basis of all advanced search algorithms. Embodiments of the present invention are applicable to search engines in any written language. Indeed, embodiments of the present invention find utility beyond character-based documents generation and searching. For example, by providing the search engine with such context, embodiments of the present invention allow the search engine to hit on the items closest to the searcher's search goal and to exclude all others. Applying aspects of the present inventions to search engines, the user may increase the effectiveness and efficiency of the search by providing context to increase the score of some hits relative to others. Providing context may also be effective in excluding undesirable items, thereby winnowing down the search results to those search results most likely to be of interest to the user. As detailed below, embodiments of the present invention are applicable to search engines in any language, irrespective of whether Roman or non-Roman characters are used in the written form thereof.

It is to be understood that the embodiments described hereunder may be used instead of or in addition to existing search engines and techniques, whether such involve compilation of the history of successful searches, frequency of links, or other known means of searching the web, searching in databases, or simply searching text documents.

According to an embodiment of the present invention, to begin a search, the user may verbally enter, type in or otherwise provide one or more search items in any language such as English (and/or his or her own native language, for example). The provided search terms may then be resolved into a list of homonyms and the methods detailed above may be used to resolve the provided search term or terms into a word, character, or set of written items. Alternating of spoken and keyed responses may quickly resolve initial designation of the search item(s) into a list of dictionary meanings, regardless of language by reference to the database 402 for the language used for the search item designation.

The dictionary meaning of the provided search term may include several dictionary meanings. For example, the English word "count" has a number of different English meanings. In Webster's Dictionary, the word "count" has having 5 major meanings and 12 minor meanings within the 5 major meanings. The ability for a user to specify one of these meanings for the searched word would allow a significantly more sophisticated search to be performed by a search engine. Even in the case where there are no matches of the search term, contextual items in the examined target sources may allow a search engine embodying aspects of the present invention to return meaningful search results. In Webster's dictionary, the word "court" is defined as follows:

Main Entry: court
Pronunciation: 'kOrt, 'kort
Function: noun
Usage: often attributive
Etymology: Middle English, from Old French, from Latin cohort-, cohors enclosure, group, retinue, cohort, from co-+-hort-, -hors (akin to hortus garden)—more at YARD 1a: the residence or establishment of a sovereign or similar dignitary 1b: a sovereign's formal assembly of councilors and officers 1c: the sovereign and officers and advisers who are the governing power 1d: the family and retinue of a sovereign 1e: a reception held by a sovereign 2a(1): a manor house or large building surrounded by usually enclosed grounds 2a(2): MOTEL 2b: an open space enclosed wholly or partly by buildings or circumscribed by a single building 2c: a quadrangular space walled or marked off for playing one of various games with a ball (as lawn tennis, handball, or basketball); also: a division of such a court 2d: a wide alley with only one opening onto a street 3a: an official assembly for the transaction of judicial business 3b: a session of such a court <court is now adjourned> 3c: a place (as a chamber) for the administration of justice 3d: a judge or judges in session; also: a faculty or agency of judgment or evaluation <rest our case in the court of world opinion—L. H. Marks>

4a: an assembly or board with legislative or administrative powers 4b: parliament, legislature 5: conduct or attention intended to win favor or dispel hostility: homage <pay court to the king>

The word "Count", therefore, has a number of different dictionary meanings that may be resolved during a search by providing the search engine with one or more associated entries. To enable this, each of these different dictionary meanings may be provided as a row in a table of the association database, with each row containing one or more associated entries related to the dictionary meaning—or associated in the user's mind with the desired dictionary meaning. According to an embodiment of the present invention, the user may, in addition to the search term, enter an associated entry, which may include, for example, a field of meaning and/or an overall context (for example, a technical area, industry, government department or the like.) Such an associated entry allows the search engine to narrow the scope of the search by limiting or expanding the scope of the search to those dictionary meanings of the provided search term or terms whose associated entries correspond to the user provided associated entry or entries. Alternatively, the search engine may award points to each solution, based in part on the contributions to the "score" made by the associations. Hierarchical categories may also be built based upon the user-entered associated entries, as well as upon previous successful searches for the user. Moreover, when a search engine according to an embodiment of the present invention performs a search, it may prompt the user to select one or more known hierarchical categories. These known hierarchical categories may have been previously seeded in the association database 402 and/or may have been previously entered associated entries of previous successful searches. Such associated entries provided by the user that resulted in a successful search may then be added to the association database 402 and become available upon the next search. The user may also be prompted to create new hierarchical categories that will be remembered as part of the user's profile and may be used in the future, given a successful outcome to the search. This is just as valid a strategy for Roman character search engines as it is with Japanese or Chinese characters. Note that the user's profile may store results of previous personal searches in the database 402 as described above and be configured to use previous associated entries to help determine the user's objective. The user may also be given the opportunity to allow or exclude such past associated entries and hierarchical categories.

The results of the search may be analyzed according to criteria that may include, for example, relevance (how many/much of the associated entries are found in the page or document or referenced hit) and intensity (the quantity of the most highly prioritized associated entries).

As in the previously described embodiments, the associated entries provided by the user in addition to the search term may be words and/or sounds or other input that is related to the search term and/or associated thereto in the user's mind. Each of the combinations of search term(s) and associated entries may be searched in parallel. For example, the user may be prompted to enter or otherwise provide five associated entries for the desired search term. Alternatively, the user may be prompted to provide a category (e.g., animal, vegetable or mineral) as his or her associated entry for the desired search term. For example, when the search term is "working dogs", the user-entered associated entries may include, for example, "canine", "hunting" and "spaniel".

Based on the contents of the association database 402 for the user, the search engine may also be configured to prompt the user for the answer to one or more questions concerning the provided search term and/or associated entries. For example, the search engine may be configured to prompt the user for additional information regarding some characteristic of the search term such as, for example, its size "Is it bigger than a breadbox?" or prompt the user to determine if the search term any physical consequences, for example. Based upon the search term and the associated entries, the search engine may search up and down the hierarchical categories, whether such categories are user provided during the current session or provided by the user during previous sessions.

The search engine may be configured to prompt the user for a classification and/or membership of the search term to focus the search. For example, according to an embodiment of the present invention, the present search engine may prompt the user to enter a characteristic of the search term as an associated entry or to further characterize a previously entered associated entry. For example, if the search term is "big" and the associated words are "destruction" and "damage", the user may be prompted to enter one or more characteristics of the search term and/or associated entry. For instance, monsters, storms, and dinosaurs are all "big" and may be retrieved, even though they are only marginally related otherwise (they all leave a trail of damage in their wake).

The search engine according to an embodiment of the present invention may also be configured to exclude certain associations and/or cluster of words. For example, the user of the present search engine may specify that certain exclusionary associated entries do not characterize the item being searched. In this manner, when hierarchical categories are present, the user may cause the search engine to clip off (i.e., not search) certain hierarchical paths and/or to not search for documents containing and/or relating to those meanings related to the exclusionary meanings. For example, the user may specify a search term of "working dogs" and specify associated entries such as "cold weather", "sled" and include a stipulation that the associated entry "Samoyed" is not to be included. In response thereto, the search engine will search for pages and documents that are associated with working dogs, cold weather and sled, but will not include search results that specify the Samoyed breed of dogs.

In the same manner, the search engine may be configured to search up or down hierarchical paths for results matching the search terms and associated entries. Entire portions of a category hierarchy may be positively included or excluded from a search.

Figure 10:
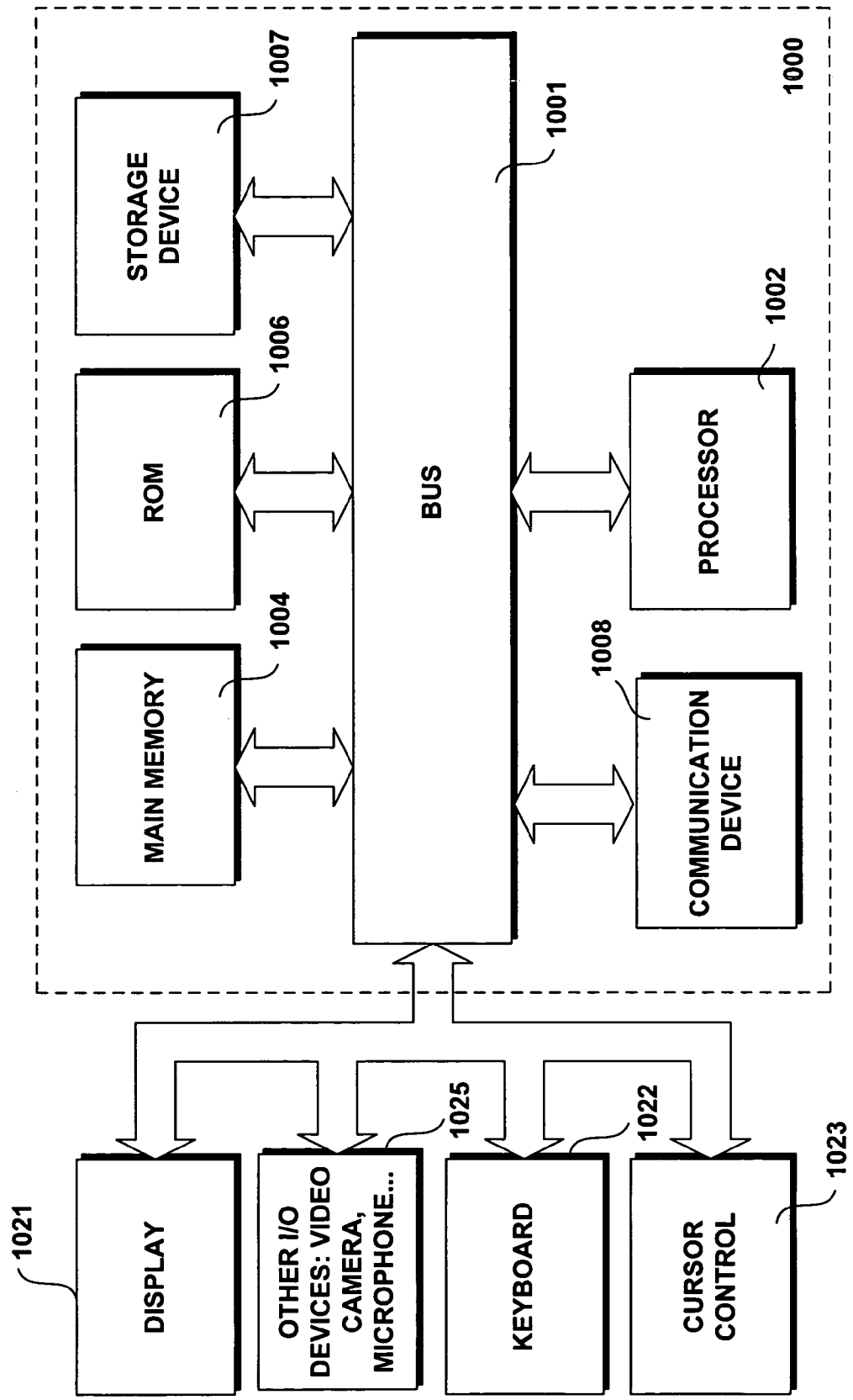
FIG. 10 shows a computer with which embodiments of the present invention may be practiced, according to an embodiment of the present invention.

FIG. 10 illustrates a block diagram of a computer system 1000 upon which embodiments of the present inventions may be implemented. Computer system 1000 includes a bus 1001 or other communication mechanism for communicating information, and one or more processors 1002 coupled with bus 1001 for processing information. Computer system 1000 further comprises a random access memory (RAM) or other dynamic storage device 1004 (referred to as main memory), coupled to bus 1001 for storing information and instructions to be executed by processor(s) 1002. Main memory 1004 also may be used for storing temporary variables or other intermediate information during execution of instructions by processor 1002. Computer system 1000 also includes a read only memory (ROM) and/or other static storage device 1006 coupled to bus 1001 for storing static information and instructions for processor 1002. A data storage device 1007, such as a magnetic disk or optical disk, is coupled to bus 1001 for storing information and instructions. The computer system 1000 may also be coupled via the bus 1001 to a display device 1021 for displaying information to a computer user. An alphanumeric input device 1022, including alphanumeric and other keys, is typically coupled to bus 1001 for communicating information and command selections to processor(s) 1002. Another type of user input device is cursor control 1023, such as a mouse, a trackball, or cursor direction keys for communicating direction information and command selections to processor 1002 and for controlling cursor movement on display 1021. A microphone may be used to provide verbal input, and cameras may be used to input user gestures or sign language, as shown at 1025.

Embodiments of the present invention are related to the use of computer system 1000 and/or to a plurality of such computer systems to enable methods and systems for entering and searching for Roman and non-Roman-alphabet characters. According to one embodiment, the methods and systems described herein may be provided by one or more computer systems 1000 in response to processor(s) 1002 executing sequences of instructions contained in memory 1004. Such instructions may be read into memory 1004 from another computer-readable medium, such as data storage device 1007. Execution of the sequences of instructions contained in memory 1004 causes processor(s) 1002 to perform the steps and have the functionality described herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art may recognize other alternative embodiments and all such embodiments are deemed to fall within the scope of the present invention.

What is claimed is:

1. A computer-implemented method for selecting a desired non-Roman-alphabet character from a set of non-Roman characters, comprising the steps of:
   providing an association database that includes, for each non-Roman-alphabet character of the set, a Roman alphabet phonetic transliteration associated with each said non-Roman-alphabet character and a plurality of words or phrases that are associated with each said non-Roman-alphabet character;
   receiving a phonetic transliteration of the desired non-Roman-alphabet character and at least one associated word or phrase that is associated with the desired non-Roman-alphabet character;
   accessing the association database and identifying as candidate characters those characters of the set that are associated with the received phonetic transliteration and with the at least one received associated word or phrase;
   if a number of candidate characters is greater than one, receiving additional associated words or phrases and repeating the accessing and identifying step until a number of candidate characters is narrowed down to a single candidate character, and
   providing the single candidate character as the desired non-Roman-alphabet character.

2. The computer-implemented method of claim 1, wherein at least one of the associated words or phrases is unrelated to a meaning of the desired character.

3. The computer-implemented method of claim 1, wherein at least one of the associated words or phrases in the associated database is user-provided.

4. The computer-implemented method of claim 1, wherein if a received associated word or phrase is not currently associated with the desired character, carrying out a step of associating the received associated word or phrase to the desired character and storing the received associated word or phrase in the association database.

5. The computer-implemented method of claim 1, wherein if a received associated word or phrase is not currently in the association database, carrying out a step of adding the received associated word or phrase to the association database.

6. The computer-implemented method of claim 1, wherein the providing step is carried out with the set of non-Roman characters including Japanese characters.

7. The computer-implemented method of claim 1, wherein the providing step is carried out with the set of non-Roman characters including Chinese characters.

8. The computer-implemented method of claim 1, wherein the providing step is carried out with the set of non-Roman characters including Korean characters.

9. The computer-implemented method of claim 1, wherein the providing step is carried out with the set of non-Roman characters including Hebrew characters.

10. The computer-implemented method of claim 1, wherein the providing step is carried out with the set of non-Roman characters including Arabic characters.

11. The computer-implemented method of claim 1, wherein the providing step is carried out with the association database including an association table having a plurality of rows, each row including a single non-Roman-alphabet character of the set, the Roman alphabet phonetic transliteration of the single non-Roman-alphabet character and a plurality of words or phrases that are associated with the single non-Roman-alphabet character.

12. The computer-implemented method of claim 1, wherein the receiving steps are carried out via voice input to a computer coupled to the association database.

13. The computer-implemented method of claim 1, wherein the receiving steps are carried out via keyboard entry to a computer coupled to the association database.

14. The computer-implemented method of claim 1, wherein the receiving steps are carried out via machine vision to a computer coupled to the association database.

15. The computer-implemented method of claim 1, further comprising a step of personalizing the association database such that the association database contains, for each user, the associated words or phrases received from each said user.

16. The computer-implemented method of claim 1, further including a step of ordering the associated words or phrases in the association database such that those received associated words or phrases that lead to the single candidate character in fewer iterations of the accessing and identifying steps are ranked higher than the associated words or phrases that lead to the single candidate character in a comparatively greater number of iterations of the accessing and identifying steps.

17. The computer-implemented method of claim 1, further including searching a computer network for documents that include the provided non-Roman-alphabet character.

18. The computer-implemented method of claim 1, wherein the receiving step is carried out with the associated word or phrase being in the same language as the desired non-Roman-alphabet character.

19. The computer-implemented method of claim 1, wherein the receiving step is carried out with the associated word or phrase being in a different language than the desired non-Roman-alphabet character.

20. The computer-implemented method of claim 1, further including successively returning to the phonetic transliteration receiving step to select a plurality non-Roman-alphabet characters.

21. A machine-readable medium having data stored thereon representing sequences of instructions which, when executed by a computing device, causes the computing device to selecting a desired non-Roman-alphabet character from a set of non-Roman characters by carrying out steps including:
   providing an association database that includes, for each non-Roman-alphabet character of the set, a Roman alphabet phonetic transliteration associated with each said non-Roman-alphabet character and a plurality of words or phrases that are associated with each said non-Roman-alphabet character;
   receiving a phonetic transliteration of the desired non-Roman-alphabet character and at least one associated word or phrase that is associated with the desired non-Roman-alphabet character;
   accessing the association database and identifying as candidate characters those characters of the set that are associated with the received phonetic transliteration and with the at least one received associated word or phrase;
   if a number of candidate characters is greater than one, receiving additional associated words or phrases and repeating the accessing and identifying step until a number of candidate characters is narrowed down to a single candidate character, and providing the single candidate character as the desired non-Roman-alphabet character.

22. The machine-readable medium of claim 21, wherein at least one of the associated words or phrases is unrelated to a meaning of the desired character.

23. The machine-readable medium of claim 21, wherein at least one of the associated words or phrases in the associated database is user-provided.

24. The machine-readable medium of claim 21, wherein if a received associated word or phrase is not currently associated with the desired character, carrying out a step of associating the received associated word or phrase to the desired character and storing the received associated word or phrase in the association database.

25. The machine-readable medium of claim 21, wherein if a received associated word or phrase is not currently in the association database, carrying out a step of adding the received associated word or phrase to the association database.

26. The machine-readable medium of claim 21, wherein the providing step is carried out with the association database including an association table having a plurality of rows, each row including a single non-Roman-alphabet character of the set, the Roman alphabet phonetic transliteration of the single non-Roman-alphabet character and a plurality of words or phrases that are associated with the single non-Roman-alphabet character.

27. The machine-readable medium of claim 21, wherein the receiving steps are carried out via voice input to a computer coupled to the association database.

28. The machine-readable medium of claim 21, wherein the receiving steps are carried out via keyboard entry to a computer coupled to the association database.

29. The machine-readable medium of claim 21, wherein the receiving steps are carried out via machine vision to a computer coupled to the association database.

30. The machine-readable medium of claim 21, further comprising a step of personalizing the association database such that the association database contains, for each user, the associated words or phrases received from each said user.

31. The machine-readable medium of claim 21, further including a step of ordering the associated words or phrases in the association database such that those received associated words or phrases that lead to the single candidate character in fewer iterations of the accessing and identifying steps are ranked higher than the associated words or phrases that lead to the single candidate character in a comparatively greater number of iterations of the accessing and identifying steps.

32. The machine-readable medium of claim 21, further including searching a computer network for documents that include the provided non-Roman-alphabet character.

33. The machine-readable medium of claim 21, wherein the receiving step is carried out with the associated word or phrase being in the same language as the desired non-Roman-alphabet character.

34. The machine-readable medium of claim 21, wherein the receiving step is carried out with the associated word or phrase being in a different language than the desired non-Roman-alphabet character.

35. The machine-readable medium of claim 21, further including successively returning to the phonetic transliteration receiving step to select a plurality non-Roman-alphabet characters.

36. A computer system for selecting a desired non-Roman-alphabet character from a set of non-Roman characters, the computer system comprising:

at least one processor;

at least one data storage device coupled to the at least one processor;

a plurality of processes spawned by said at least one processor, the processes including processing logic for:

providing an association database that includes, for each non-Roman-alphabet character of the set, a Roman alphabet phonetic transliteration associated with each said non-Roman-alphabet character and a plurality of words or phrases that are associated with each said non-Roman-alphabet character;

receiving a phonetic transliteration of the desired non-Roman-alphabet character and at least one associated word or phrase that is associated with the desired non-Roman-alphabet character;

accessing the association database and identifying as candidate characters those characters of the set that are associated with the received phonetic transliteration and with the at least one received associated word or phrase;

if a number of candidate characters is greater than one, receiving additional associated words or phrases and repeating the accessing and identifying step until a number of candidate characters is narrowed down to a single candidate character, and providing the single candidate character as the desired non-Roman-alphabet character.

37. The computer system of claim 36, wherein at least one of the associated words or phrases is unrelated to a meaning of the desired character.

38. The computer system of claim 36, wherein at least one of the associated words or phrases in the associated database is user-provided.

39. The computer system of claim 36, wherein if a received associated word or phrase is not currently associated with the desired character, carrying out a step of associating the received associated word or phrase to the desired character and storing the received associated word or phrase in the association database.

40. The computer system of claim 36, wherein if a received associated word or phrase is not currently in the association database, carrying out a step of adding the received associated word or phrase to the association database.

41. The computer system of claim 36, wherein the providing step is carried out with the association database including an association table having a plurality of rows, each row including a single non-Roman-alphabet character of the set, the Roman alphabet phonetic transliteration of the single non-Roman-alphabet character and a plurality of words or phrases that are associated with the single non-Roman-alphabet character.

42. The computer system of claim 36, wherein the receiving steps are carried out via voice input to a computer coupled to the association database.

43. The computer system of claim 36, wherein the receiving steps are carried out via keyboard entry to a computer coupled to the association database.

44. The computer system of claim 36, wherein the receiving steps are carried out via machine vision to a computer coupled to the association database.

45. The computer system of claim 36, further comprising a step of personalizing the association database such that the association database contains, for each user, the associated words or phrases received from each said user.

46. The computer system of claim 36, farther including a step of ordering the associated words or phrases in the association database such that those received associated words or phrases that lead to the single candidate character in fewer iterations of the accessing and identifying steps are ranked higher than the associated words or phrases that lead to the single candidate character in a comparatively greater number of iterations of the accessing and identifying steps.

47. The computer system of claim 36, further including searching a computer network for documents that include the provided non-Roman-alphabet character.

48. The computer system of claim 36, wherein the receiving step is carried out with the associated word or phrase being in the same language as the desired non-Roman-alphabet character.

49. The computer system of claim 36, wherein the receiving step is carried out with the associated word or phrase being in a different language than the desired non-Roman-alphabet character.

50. The computer system of claim 36, further including successively returning to the phonetic transliteration receiving step to select a plurality non-Roman-alphabet characters.

51. A computer-implemented method of searching for documents that include one or more predetermined non-Roman-alphabet characters that are unknown to a user, comprising the steps of:
    providing a pronunciation of the desired non-Roman-alphabet character;
    providing at least one associated word or phrase that the user associates with the desired non-Roman-alphabet character;
    causing a retrieval from an association database of one ore more candidate characters whose pronunciation matches the provided pronunciation and that is associated with one or more of the at least one associated word or phrase;
    if the number of candidate characters is greater than one, providing additional associated words or phrases and repeating the retrieval causing step until a single candidate character is retrieved, and
    causing a search to be carried out for documents that include the single candidate character.

52. The computer implemented method of claim 51, wherein in the pronunciation providing step, the pronunciation is a phonetic pronunciation.

53. The computer-implemented method of claim 51, wherein in the associated word or phrase providing step, at least one of the associated words or phrases is unrelated to a meaning of the predetermined character.

54. The computer-implemented method of claim 51, wherein if a provided associated word or phrase is not currently associated with the predetermined character, further carrying out a step of associating the provided associated word or phrase to the predetermined character and storing the received associated word or phrase in the association database.

55. The computer-implemented method of claim 51, wherein if a provided associated word or phrase is not currently in the association database, carrying out a step of adding the provided associated word or phrase to the association database.

56. The computer-implemented method of claim 51, wherein the pronunciation providing step is carried out with the non-Roman character being a Japanese character.

57. The computer-implemented method of claim 51, wherein the pronunciation providing step is carried out with the non-Roman character being a Chinese character.

58. The computer-implemented method of claim 51, wherein the pronunciation providing step is carried out with the non-Roman character being a Korean character.

59. The computer-implemented method of claim 51, wherein the pronunciation providing step is carried out with the non-Roman character being a Hebrew character.

60. The computer-implemented method of claim 51, wherein the pronunciation providing step is carried out with the non-Roman characters being an Arabic character.

61. The computer-implemented method of claim 51, wherein the retrieval causing step is carried out with the association database including an association table having a plurality of rows, each row including a single different non-Roman-alphabet character, the Roman alphabet pronunciation of the single non-Roman-alphabet character and a plurality of words or phrases that are associated with the single non-Roman-alphabet character.

62. The computer-implemented method of claim 51, wherein the providing steps are carried out via voice input to a computer coupled to the association database.

63. The computer-implemented method of claim 51, wherein the providing steps are carried out via keyboard entry to a computer coupled to the association database.

64. The computer-implemented method of claim 51, wherein the providing steps are carried out via a machine vision to a computer coupled to the association database.

65. The computer-implemented method of claim 51, further comprising a step of logging in such that the retrieval causing step causes a retrieval of the at least one candidate character from an association that is personalized to the logged in user.

66. The computer-implemented method of claim 51, wherein the search causing step causes a search of a computer network for the documents.

67. The computer-implemented method of claim 51, wherein the associated word or phrase providing step is carried out with the associated word or phrase being in the same language as the predetermined non-Roman-alphabet character.

68. The computer-implemented method of claim 51, wherein the associated word or phrase providing step is carried out with the associated word or phrase being in a different language than the predetermined non-Roman-alphabet character.

69. The computer-implemented method of claim 51, further including successively returning to the pronunciation-providing step to retrieve additional candidate characters for additional predetermined non-Roman-alphabet characters.

70. The computer-implemented method of claim 51, wherein the pronunciation in the pronunciation-providing step is configured to use a phonetic alphabet.

71. The computer-implemented method of claim 51, wherein the retrieval causing step is configured to cause a retrieval of at least one of a Roman character, a non-Roman characters, a picture, music and any computer-readable file.

* * * * *